US012051336B2

(12) United States Patent
Watson

(10) Patent No.: US 12,051,336 B2
(45) **Date of Patent: *Jul. 30, 2024**

(54) AUTONOMOUS AIRCRAFT SEPARATION SYSTEM AND METHOD

(71) Applicant: Airspeed Systems LLC, Chicago, IL (US)

(72) Inventor: Craig M. Watson, Chicago, IL (US)

(73) Assignee: Airspeed Systems LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,920

(22) Filed: Apr. 24, 2023

(65) Prior Publication Data

US 2023/0260408 A1 Aug. 17, 2023

Related U.S. Application Data

(63) Continuation of application No. 17/700,382, filed on Mar. 21, 2022, now Pat. No. 11,636,769, which is a (Continued)

(51) Int. Cl.
*G08G 5/00* (2006.01)
*G08G 5/04* (2006.01)

(52) U.S. Cl.
CPC ......... *G08G 5/0039* (2013.01); *G08G 5/0013* (2013.01); *G08G 5/0021* (2013.01); (Continued)

(58) Field of Classification Search
CPC .. G08G 5/0039; G08G 5/0013; G08G 5/0026; G08G 5/0043; G08G 5/0052; G08G 5/045; G08G 5/0021
See application file for complete search history.

(56) References Cited

U.S. PATENT DOCUMENTS 7,136,016 B1 * 11/2006 Swensen .............. G08G 5/0043 342/455
8,108,087 B2 1/2012 Stone et al.
(Continued)

FOREIGN PATENT DOCUMENTS

CN 102651176 A 8/2012
CN 110968941 A 4/2020
(Continued)

OTHER PUBLICATIONS

China National Intellectual Property Administration, Office Action and Search Report in Chinese Patent Application No. 202280005475.2 (Aug. 24, 2023).
(Continued)

*Primary Examiner* — Andrew W Bee
(74) *Attorney, Agent, or Firm* — Leydig, Voit & Mayer, Ltd.

(57) ABSTRACT

An autonomous airspace separation system monitors flight separation for compliance with a separation standard. A reference formation airspace is established based on minimum longitudinal, lateral and vertical parameters. When penetration of the reference formation airspace is detected, a penetration airspace is established based on a deformation of the reference formation airspace caused by the penetrating aircraft. A centroid of the penetration airspace is determine and a target separation to the centroid is supplied to the aircraft to reestablish safe separation.

18 Claims, 12 Drawing Sheets

Related U.S. Application Data continuation of application No. 17/492,904, filed on Oct. 4, 2021, now Pat. No. 11,282,398.

(52) U.S. Cl.
CPC ......... *G08G 5/0026* (2013.01); *G08G 5/0043* (2013.01); *G08G 5/0052* (2013.01); *G08G 5/045* (2013.01)

(56) References Cited

U.S. PATENT DOCUMENTS

| | | | |
|---|---|---|---|
| 8,744,738 | B2 | 6/2014 | Bushnell |
| 9,137,847 | B1 | 9/2015 | Ayyagari et al. |
| 9,536,435 | B1 | 1/2017 | Shay |
| 10,302,759 | B1 | 5/2019 | Arteaga |
| 10,777,086 | B2 | 9/2020 | Barker |
| 10,867,519 | B2 | 12/2020 | Mecklem et al. |
| 11,282,398 | B1 | 3/2022 | Watson |
| 11,636,769 | B1 | 4/2023 | Watson |
| 2005/0200501 | A1 | 9/2005 | Smith |
| 2010/0292871 | A1 | 11/2010 | Schultz et al. |
| 2014/0197981 | A1 | 7/2014 | Hartley et al. |
| 2017/0083979 | A1* | 3/2017 | Winn ...................... H04Q 9/02 |
| 2017/0084183 | A1 | 3/2017 | Knox |
| 2017/0103660 | A1 | 4/2017 | Shafaat |
| 2018/0240348 | A1 | 8/2018 | Ren |
| 2018/0366012 | A1 | 12/2018 | Glatfelter |
| 2019/0180631 | A1 | 6/2019 | Venkataramana et al. |
| 2021/0197966 | A1 | 7/2021 | Zhang et al. |
| 2023/0108873 | A1 | 4/2023 | Watson |

FOREIGN PATENT DOCUMENTS

| | | | |
|---|---|---|---|
| JP | 2022-147583 | A | 10/2022 |
| WO | WO 2020/090560 | A1 | 5/2020 |
| WO | WO 2020/189702 | A1 | 9/2020 |
| WO | WO 2021/079108 | A1 | 4/2021 |

OTHER PUBLICATIONS

Brittain et al., "A Deep Multi-Agent Reinforcement Learning Approach to Autonomous Separation Assurance," arXiv:2003.08353v2 [cs. LG], Aug. 27, 2020, 26 pages.
Ramasamy, "Next Generation Flight Management Systems for Manned and Unmanned Aircraft Operations—Automated Separation Assurance and Collision Avoidance Functionalities," Ph.D. Thesis, RMIT University, Feb. 2017, 366 pages.
United States Patent and Trademark Office, International Search Report and Written Opinion in International Patent Application No. PCT/US2022/021046 (Aug. 1, 2022).
United States Patent and Trademark Office, International Search Report and Written Opinion in International Patent Application No. PCT/US2022/038003 (Aug. 23, 2022).
Japan Patent Office, Notice of Reasons for Rejection in Japanese Patent Application No. 2022-561625 (Nov. 22, 2023).

* cited by examiner

AUTONOMOUS AIRCRAFT SEPARATION SYSTEM AND METHOD

CROSS REFERENCE TO RELATED APPLICATIONS

This patent application is a continuation of U.S. patent application Ser. No. 17/700,382, filed Mar. 21, 2022, which is a continuation of U.S. patent application Ser. No. 17/492,904, filed Oct. 4, 2021, which issued as U.S. Pat. No. 11,282,398 on Mar. 22, 2022, all of which are incorporated by reference in their entirety herein.

TECHNICAL FIELD

The disclosure relates generally to aircraft position control and management, and more particularly to a method and system for monitoring and managing separation standards for multiple aircraft in a shared airspace region.

BACKGROUND

Aircraft weighing more than a certain weight and cleared to fly above certain altitudes are subject to global air traffic control (ATC) standards that mandate minimum separation between aircraft, longitudinally, laterally, and vertically. Separation between aircraft has been and will continue to be reduced over time so more flights can be managed in tighter airspace, and so more individual flights can be guided more precisely to different "tracks" and changing altitudes to generate fuel savings and reduce carbon emissions.

Tighter stacking of aircraft is enabled by technologies such as the Global Positioning System (GPS) which tracks aircraft over their entire route (including trans-oceanic flight paths), without reliance on ground-based radars that cannot reach across oceans. GPS-based systems (e.g., Automatic Dependent Surveillance-Broadcast, or "ADS-B") transmit key data every second, bringing enhanced clarity, accuracy, and precision to the management of airspace. As a result, even more aircraft can be managed in already-crowded airspace such as the North Atlantic corridor.

But managing more aircraft in less airspace has critical implications: First, even the most advanced air traffic control surveillance capabilities continue to rely heavily on human controllers to provide specific instructions and clearance to pilots of an increasing volume of aircraft. These instructions (mandatory pilot compliance) and advisories (voluntary pilot compliance) centrally direct aircraft to modify heading, airspeed, and altitude to maintain separation, change position, or otherwise ensure safety in the face of planned and unplanned factors. In addition to air traffic controllers, tighter aircraft stacking impacts the other human actor—pilots—reducing their response time in emergencies such as the incidence of wind shear in the trans-Atlantic corridor, and increasing the risks as aircraft are pushed off their now more-tightly planned tracks, or seek higher altitudes in crowded tracks to yield fuel savings.

Technology is enabling onboard airplane-to-airplane receipt of precise aircraft position data, resulting in improved pilot situation awareness and reduced dependence on ATC intermediation. Nevertheless, a pilot in fast-changing airspace has relatively constrained awareness, limited scope of action and only a short time to respond. Real-time decisions about the adjustments needed to maintain minimum separation and safe flight will continue to be an airplane-by-airplane burden on human air traffic controllers and individual pilots.

SUMMARY

Disclosed is a system and method for autonomously determining, displaying (e.g., on a display device), and directing the target trajectories each aircraft should fly to regain or maintain safe separation from one or more aircraft in a shared airspace. In an embodiment, the system guides one or more pilots to independently make flight adjustments directed to maintaining or restoring safe aircraft separation, and does so without central guidance from air traffic control, or any form of communication among pilots to coordinate their respective maneuvers.

Also disclosed is a system and method for determining, displaying, and implementing how two or more aircraft in too close proximity can safely and autonomously maneuver to regain safe separation without the intervention of air traffic controllers, without any communication between the pilots of the aircraft, and without direct coordination or linkage between the systems onboard each aircraft. The disclosed system installed on multiple aircraft independently directs each to restore minimum separation through complementary recovery actions completely autonomously. Resulting benefits include reduced burden on pilots and air traffic controllers in managing the escalating pressures of increasingly tight aircraft stacking and potentially fast-changing airspace conditions.

In an embodiment, two features enable achieving safe and autonomous separation: First, a system-generated initial reference formation airspace establishes a "picket fence" of virtual surrounding aircraft based on a formation of a set of virtual aircraft positioned at the regulatory minimum longitudinal, minimum lateral, and minimum vertical separation positions around the current position of an aircraft. This positioning of virtual aircraft forms a rectangular prism or "flying box" around the center reference aircraft that is the baseline for defining safe separation and therefore for identifying penetration of this reference formation airspace.

The second feature is the application of centroid vectoring to establish a target separation vector to restore safe separation between aircraft. The centroid is the geometric balance point computed from the vertices within any space, and is the ideal target for establishing a vector toward separation. According to an embodiment, two aircraft, which have either penetrated their respective airspaces or are on a path that would result in airspace penetration, may be given target separation vectors to redirect them to the centroids of their respective penetrated airspaces. Thus directed, each aircraft will independently move in a way that restores safe separation for both aircraft, while also maintaining separation from the virtual aircraft on station around the original perimeter of each aircraft which act as proxies for any other aircraft that might be close to minimum separation distance.

The aircraft at the center of this reference formation airspace is referred to as the "reference aircraft," and it occupies the "centroid" position of its respective reference formation airspace. In physics and geometry, a centroid is the mean position within a particular space, and represents the average position relative to all the points of the space. As such, the properties of the centroid make it ideal as a guiding position: it is always at the center of the vertices of any formation, however uniform or uneven; it is always inside the formation, thus always keeping a reference aircraft from breaching its own reference formation airspace; and the centroid can be calculated through a mathematical computation well within the capability of onboard avionics equipment. In an embodiment, the reference formation airspace forms a rectangular prism, and the centroid is at the intersection of the diagonals drawn from each opposing corner, positioning it at the three-dimensional center of the rectangular prism.

When a penetration of an airspace occurs among two or more aircraft, in addition to being in violation of minimum separation standards, the formation airspace of at least one aircraft is penetrated and thus deformed, causing each aircraft to no longer occupy the centroid position relative to its original formation airspace (because the formation airspace itself has been distorted by the penetration). In an embodiment, each aircraft equipped or in communication with the disclosed system is autonomously provided a target separation vector determined based on the new "penetration airspace" defined by the positions of the original surrounding virtual aircraft, plus the position of the penetrating aircraft. All of these positions are known: the virtual aircraft are known with precision based on their position relative to and moving in tandem with the reference aircraft, enabling the coordinates of each virtual aircraft can be calculated precisely. The penetrating aircraft is also trackable precisely by its GPS position received by the aircraft flight management system. Each aircraft's autonomous separation unit generates the dimensions of the penetrated airspace based on both virtual and penetrating aircraft positions. Based on these inputs, a new centroid is determined for each aircraft relative to its own penetrated airspace. With the centroid located, the ASU system generates a target separation vector to that new centroid. Each aircraft's heading toward the centroid of its penetrated airspace represents an optimal separation solution, because each aircraft's penetrated airspace is distinct, each heading will always be away from the other penetrating aircraft, and the separation vector each aircraft follows will always be inward to its respective penetrated airspace, thus retaining adequate separation relative to any aircraft represented by the virtual aircraft positions as well.

Several features of this autonomous resolution of minimum separation standards make it an appealing solution to the problem of maintaining safe separation among aircraft without requiring either pilot or controller human intervention:

a. The reference formation airspace configured based on virtual aircraft positions can be set based on any desired longitudinal, lateral, or vertical separation distances, and does not depend on receiving real data from other aircraft or systems;

b. While the reference formation airspace is notional, it has real coordinates around the reference aircraft, and these move with the aircraft in a "flying box" incorporating altitude as a third dimension;

c. The reference formation airspace may be comprised of sixteen virtual aircraft, eight aircraft at all four corners and at the center of each side on the plane above the center aircraft, and eight on the lower plane. When the reference formation airspace box is penetrated, the penetrating aircraft is tracked, but the remaining virtual aircraft also ensure that the separation trajectory is a vector that considers all the aircraft that could possibly be nearby or approaching from any direction;

d. The resulting penetrated airspace is a combination of the original reference formation airspace (some of the sides of which may not be impacted by the penetration), and the new coordinates of the penetrated portion of the reference formation airspace;

e. The coordinates of the newly-formed penetrated airspace are known through a combination of original reference formation airspace coordinates and new position data of the at least one penetrating aircraft;

f. Based on these coordinates, a penetrated airspace is generated and its centroid is determined, a process that can be performed dynamically if the penetrating aircraft continues to move, changing or decreasing separation;

g. The centroid of the penetrated airspace is defined in relation to each of the vertices of the shape of the penetrated airspace, and is calculated with sufficient specificity to generate a destination point with a specific position in relation to the reference aircraft. This enables a bearing and airspeed to be set to give the reference aircraft a new heading to move toward the centroid of the penetrated airspace;

h. Each conflicting aircraft may generate its own penetration airspace and each will set course to its own new centroid;

i. Because each centroid is at the geometric center of its own penetrated airspace, and because the centroid will always move away from an approaching vertex (created by the penetration), as each aircraft moves toward its own centroid they are always moving away from each other.

In an embodiment, the system operates at a range beyond that of Traffic Collision Avoidance Systems (TCAS) that aircraft are also equipped with and that are activated when proximities and speeds suggest the potential for imminent collision.

Embodiments of the disclosed system have benefits for pilots and for air traffic controllers:

a. For a single pilot in control, the system is embodied in an onboard ASU that shows on the existing flight management system display the path to restoring safe separation among possibly multiple penetrating aircraft;

b. For multiple pilots in the same shared airspace, each equipped with their own ASU, the airspace-specific guidance provided to each simultaneously restores safe separation for all aircraft without requiring any form of communication among pilots or aircraft systems. For both individual and multiple pilots, when the system operates in a fully-automated state linked to the aircraft's autopilot, the ASU will make faster and more accurate decisions in the face of changing data and operating conditions that may overwhelm even the most experienced pilots;

c. Finally, for air traffic controllers, the system processes the same data air traffic control uses to identify aircraft that have violated or are at risk of violating minimum separation standards. This GPS-based positional data can be further processed as outlined in the earlier example to determine centroid locations and target separation vectors to direct each aircraft toward its own path based on the aircraft in its airspace, and independent of air traffic controller intervention.

In an embodiment, disclosed is a method for managing aircraft flight separation of a plurality of aircraft in a flight information region for compliance with a predetermined separation standard that includes minimum longitudinal, minimum lateral and minimum vertical separation parameters, the method comprising the steps of (1) receiving current position data for each of the aircraft in the flight information region, (2) constructing, for each of the aircraft in the flight information region, a reference formation airspace in the form of a rectangular prism with dimensions based upon the minimum longitudinal, minimum lateral and minimum vertical separation parameters, and with the centroid of the formation airspace as the current position of the aircraft, (3) comparing, for a first aircraft in the flight information region, the reference formation airspace of the first aircraft to the current position of a second aircraft in the flight information region, to determine if the second aircraft has penetrated the reference formation airspace of the first aircraft, and if the second aircraft has penetrated the reference formation airspace of the first aircraft: (a) constructing a penetration airspace of the first aircraft representing a modification of the reference formation airspace of the first aircraft deformed by the position data of the second aircraft, (b) determining a centroid of the penetration airspace of the first aircraft, and (c) generating a target separation vector defined by the direction from the current position of the first aircraft to the centroid of the penetration airspace of the first aircraft.

In an embodiment, the target separation vector is transmitted to the first aircraft and/or to an air traffic control system associated with the flight information region.

In an embodiment, the steps of the method are continuously performed in real time for each of the aircraft in the flight information region with respect to all the other aircraft in the flight information region.

In an embodiment, the reference formation airspace may be constructed by defining positions of 16 virtual aircraft located at the vertices and the center edges of the rectangular prism. In alternative embodiments, the airspace may be defined by more or fewer virtual aircraft arranged about the periphery of the rectangular prism. Further, the penetration airspace may be constructed based upon the set of virtual aircraft with the position of one of the aircraft closest to the penetrating aircraft modified to the position of the penetrating aircraft. In an alternative arrangement, the position of the penetrating aircraft may form an additional vertex for defining the penetration airspace.

In an embodiment, the method may include configuring a proximity risk trigger defined by a proximity distance, generating a proximity risk warning when another aircraft is within the proximity distance to the reference formation airspace of an aircraft, and sending the proximity risk warning to least one of the aircraft, the other penetrating aircraft or an air traffic control system associated with the flight information region.

In an embodiment, disclosed is a method for managing aircraft flight separation of a reference aircraft during flight for compliance with a predetermined separation standard that includes minimum longitudinal, minimum lateral and minimum vertical separation parameters, the method including the steps of receiving current position data of the reference aircraft, constructing a reference formation airspace in the form of a rectangular prism with dimensions based upon the minimum longitudinal, minimum lateral and minimum vertical separation parameters and the centroid of the formation airspace as the current position of the reference aircraft, defining positions of 16 virtual aircraft located at the vertices and the center edges of the reference formation airspace, receiving at least position data of other aircraft within a predetermined distance to the reference formation airspace, and if at least one of the other aircraft penetrates the reference formation airspace: (1) constructing a penetration airspace defined by the positions of the 16 virtual aircraft wherein the position of one of the virtual aircraft closest to the penetrating aircraft is modified to the position of the penetrating aircraft, (2) determining a centroid of the penetration airspace, (3) generating a target separation vector extending from the current position of the reference aircraft to the centroid of the penetration airspace, and (4) sending the target separation vector to the reference aircraft.

The steps of the method may be performed continuously in real time.

In an embodiment, if an approaching or penetrating aircraft is determined to be within a collision risk distance, the method may hand off control to an onboard collision avoidance system.

In an embodiment, the target separation vector may be sent to an onboard autopilot system, or, if an autopilot system is not present or not engaged, the target separation vector may be displayed on a pilot display.

In an embodiment, the penetration airspace may be defined by the positions of multiple penetrating aircraft and the positions of the multiple aircraft.

In an embodiment, disclosed is a method for managing aircraft flight separation of a reference aircraft during flight for compliance with a predetermined separation standard that includes minimum longitudinal, lateral and vertical separation parameters, the method including the steps of receiving position data of the reference aircraft, constructing a reference formation airspace in the form of a rectangular prism with dimensions based upon the minimum longitudinal, lateral and vertical separation parameters and the position of the reference aircraft as the centroid of the reference formation airspace, receiving position data of at least one other aircraft that is nearest to the reference formation airspace, if the at least one other aircraft penetrates into the reference formation airspace: (1) constructing a penetration airspace representing a modification of the reference formation airspace deformed by at least the position data of the at least one other aircraft, (2) determining a centroid of the penetration airspace, and (3) sending to the reference aircraft a vector representing a direction to the centroid of the penetration airspace.

In an embodiment, the method may define a plurality of virtual positions spaced about the vertices and the edges of the reference formation airspace, and wherein the penetration airspace is represented by the plurality of virtual positions and the penetrating aircraft position.

DRAWINGS

The disclosed embodiments may be understood from the following detailed description taken in conjunction with the accompanying drawings of which:

DETAILED DESCRIPTION

Figure 1:
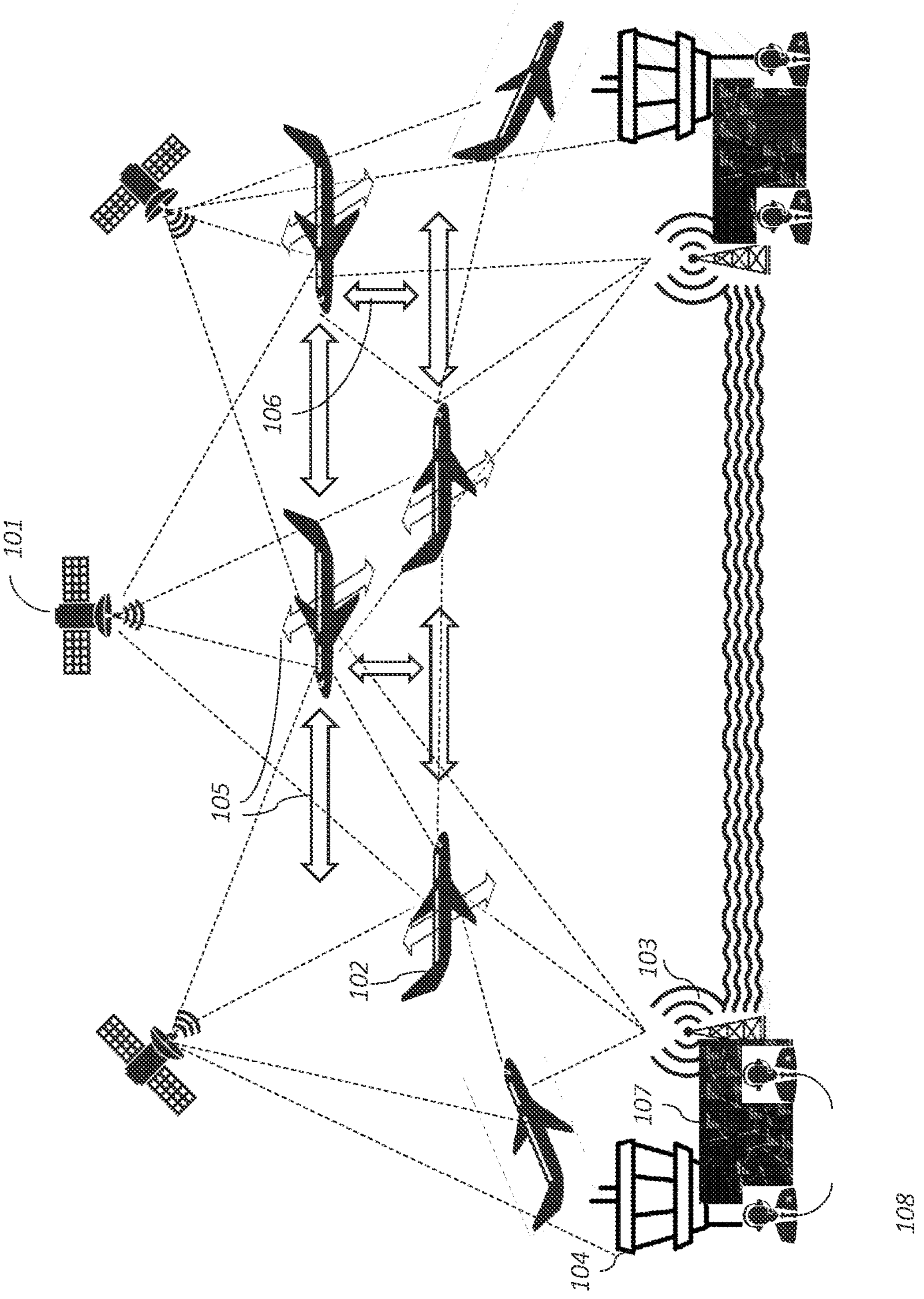
FIG. 1 illustrates a conventional air traffic management environment, depicting the interaction of satellites, aircraft, controllers, and pilots.

Turning to FIG. 1, the overall operation of a conventional GPS-based air traffic control and navigation system is illustrated. The conventional airspace management system has been transformed by GPS satellites capable of capturing and transmitting data about aircraft even beyond the range of ground-based radars, and anywhere in the world, including previously unreachable ocean airspace. Satellites 101 are always orbiting the globe, collecting data from onboard transponders, and transmitting data to other aircraft 102, ground stations 103, and airport control towers 104. Aircraft, in turn, are transmitting data to other aircraft and to ground stations as well. The data being broadcast and received include identification, position, altitude, airspeed, category, climbing, descending, and turning information updated typically on a second-by-second basis. Within this data-rich context, aircraft separation relative to established minimum standards is also tracked, including longitudinal and lateral separation 105, as well as the vertical separation 106 between aircraft. Within given airspace control areas, this information is projected onto air traffic control screens 107 which monitor the data with a view to managing traffic spacing, flow, track density, and dynamic changes in wind, weather conditions, and emergency conditions. Air traffic controllers 108 at airports and non-airport Area Control Centers controlling Flight Information Regions (FIRs) issue directives and advisories to pilots to ensure safety, efficiency, and flow from point-to-point airport locations.

Figure 2:
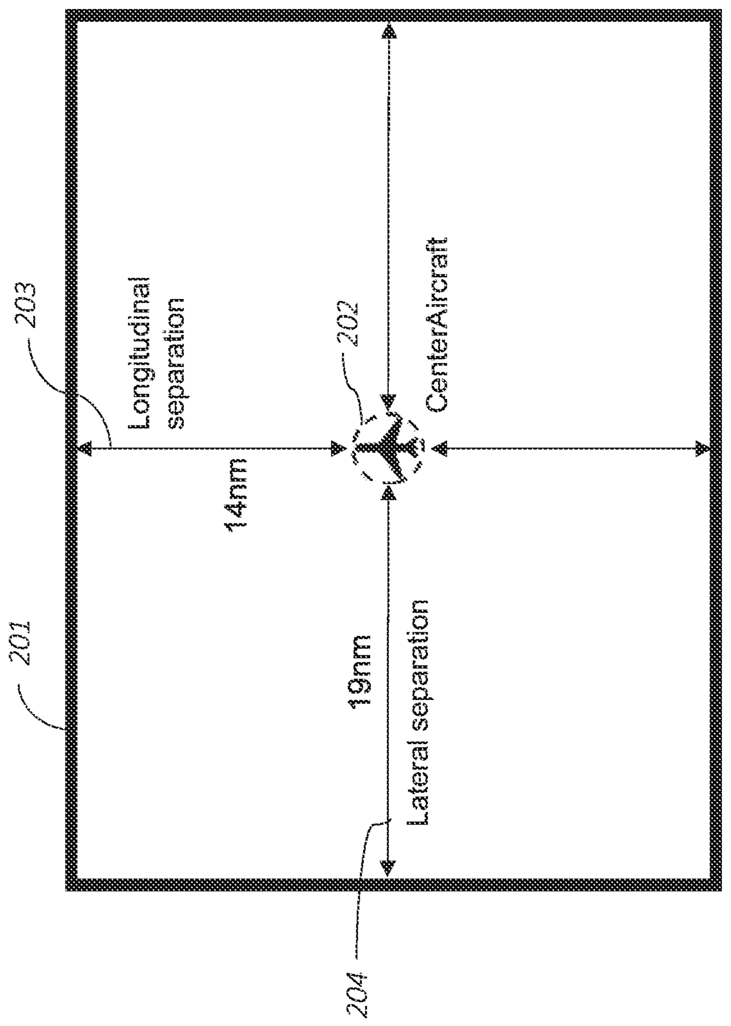
FIG. 2 is a representation of the minimum separation standard for aircraft separation in longitudinal and lateral space as applied to aircraft of a certain takeoff weight, and flying above a certain altitude.

FIG. 2 illustrates a minimum separation "box" 201 created by the minimum longitudinal and lateral separation standards around a reference aircraft 202 located at the center. For example, a typical longitudinal separation 203 may be 14 nautical miles (nm) between aircraft in front and behind, and a typical lateral separation 204 may be 19 nm between aircraft side to side. In addition, a typical vertical separation of 1000 to 3,500 feet (not illustrated) creates a third dimension for the minimum separation standard.

Figure 3:
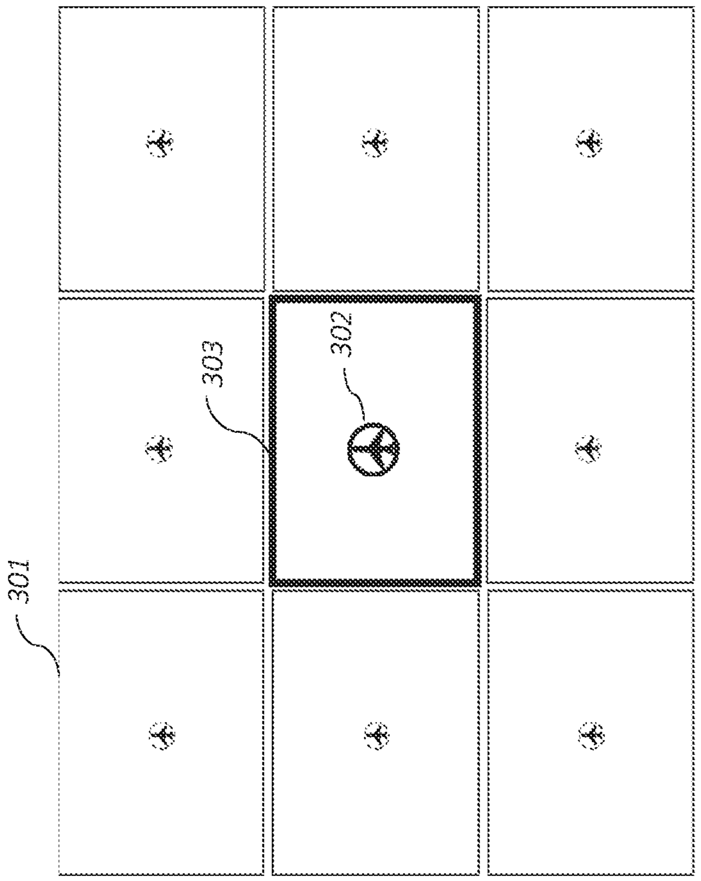
FIG. 3 illustrates an array of "surrounding aircraft," those immediately relevant to the maintenance of minimum separation standards both longitudinally and laterally with respect to the center reference aircraft.

FIG. 3 illustrates an array 301 of eight aircraft surrounding the center reference aircraft 302 on all sides adjacent to its separation standard spacing represented by the box 303. Note this is only showing the top or bottom plane of such aircraft, so there are two such spaces above and below the center reference aircraft 302, totaling 16 aircraft. This spacing is equivalent for all surrounding aircraft, but as illustrated, the spacing is twice that required, since each box already marks a minimum separation perimeter.

Figure 4:
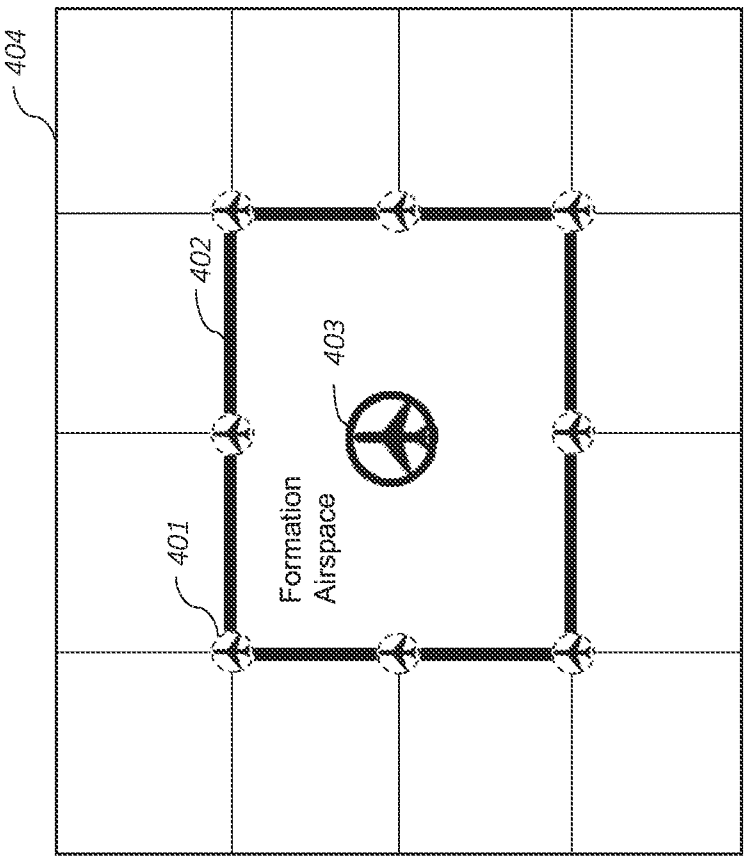
FIG. 4 shows the same array of separation-relevant surrounding aircraft as in FIG. 3, compressed into their minimum separation space, thus creating the reference formation airspace of virtual aircraft surrounding the center aircraft.

In FIG. 4, the positions of the eight surrounding aircraft 401 have been collapsed to positions exactly on the perimeter 402 of the center aircraft 403, specifically exactly matching separation standards. The surrounding aircraft completely cover the standard separation airspace around the center reference aircraft 403. Each of the relevant airspaces of the surrounding perimeter aircraft extends even further beyond the separation standard for the reference aircraft 403. This space 402 is designated as the reference formation airspace of the center reference aircraft 403.

The reference formation airspace of the center reference aircraft 403 is the minimum separation airspace subtended by the positions of all the aircraft 401 located around the perimeter of the airspace 402. This reference formation airspace 402 around the center reference aircraft 403 is a mathematical construct with an interior space and a specifically defined perimeter populated by the virtual aircraft 401. The reference formation airspace box 402 moves continuously as the center reference aircraft 403 moves. Computationally, the location of the perimeter of the reference formation airspace 402 is known, and therefore its penetration by any other aircraft, representing a breach of the minimum separation standards, can be detected and its penetration depth and velocity measured with respect to the reference formation airspace 402.

Figure 5A:
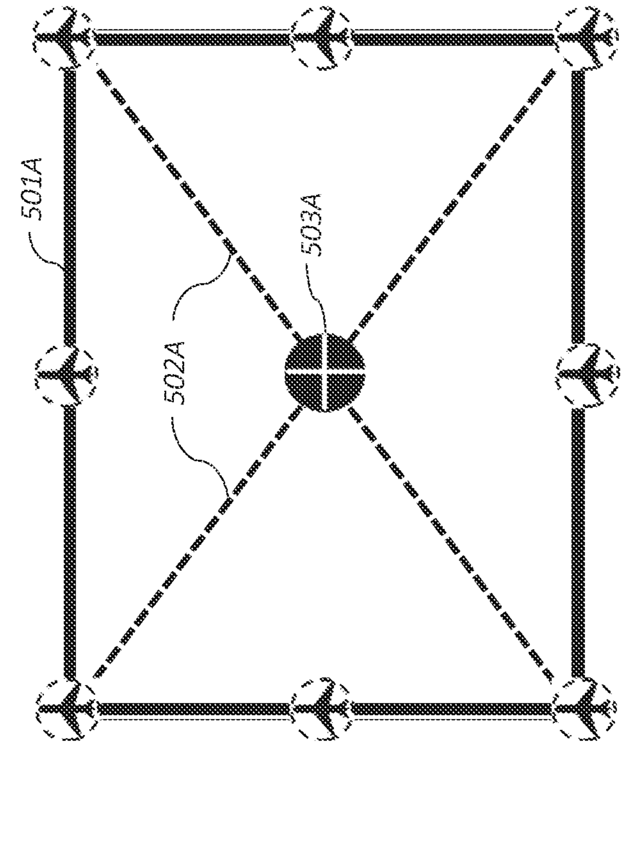
FIG. 5A illustrates the reference formation airspace bisected by two diagonals that, together, designate the standard centroid of the rectangular reference formation airspace.

FIG. 5A illustrates, according to an embodiment, the position of the center reference aircraft relative to the reference formation airspace 501A. The center reference aircraft is located at the center of 503A of the reference formation airspace 501A. The center of the reference formation airspace is also the centroid of the reference formation airspace. The centroid is the mean position of a geometric shape, and in the case of a rectangle such as 501A is determined by the intersection of the diagonals 502A, which intersect at the centroid 503A represented by the black circle with white cross hairs in this as well as the following figures. In an embodiment, the same concepts extend to the vertical dimension, which will be shown in a subsequent figure.

Figure 5B:
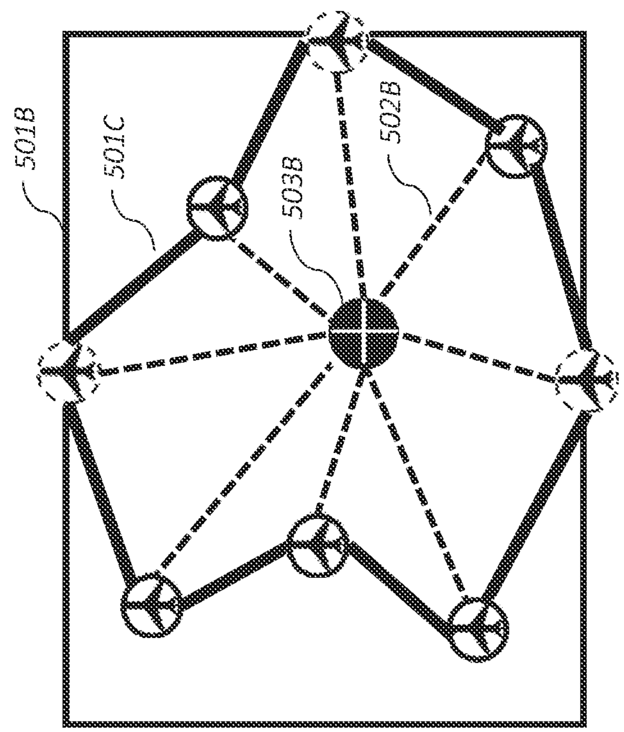
FIG. 5B shows several aircraft penetrating the reference formation airspace and violating the separation standards relative to a center reference aircraft, and showing the ability to still determine the centroid position in the penetrated airspace, notwithstanding the deformed nature of the penetrated airspace.

FIG. 5B illustrates, according to an embodiment, the concept of the centroid in the context of a reference formation airspace penetrated by five real aircraft. For purposes of illustration in FIG. 5B and following, virtual aircraft are illustrated with a dashed circle, and real aircraft, such as penetrating aircraft, are represented with a solid circle. As illustrated, the original reference formation airspace 501B has been modified and deformed by the aircraft that have penetrated the reference formation airspace. According to an embodiment, the reference formation airspace is modified by replacing virtual aircraft positions with penetrating aircraft positions to form the penetration airspace. In an alternative embodiment, the reference formation airspace may be deformed by utilizing the position of a penetrating aircraft as an additional point, in addition to the positions of the virtual aircraft, to form the penetration airspace. In the illustrated embodiment, five virtual aircraft have been replaced by five penetrating aircraft to form the penetrated airspace 501C. Even such a completely deformed penetration airspace still has a centroid 503B whose location relative to all the vertices of the penetration airspace 501C can be computed by way of integrals.

Figure 6A:
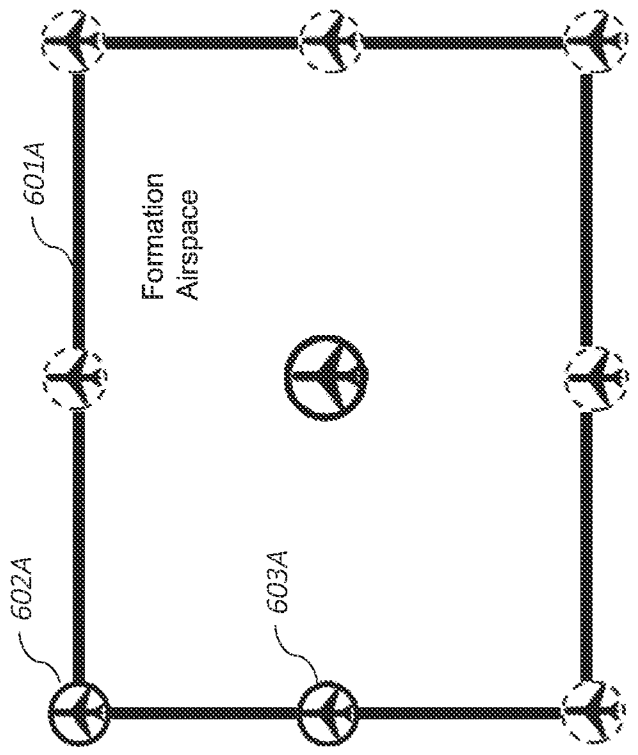
FIG. 6A illustrates the standard reference formation airspace in which each of the eight virtual aircraft is on station at the minimum separation airspace position relative to the center reference aircraft.
Figure 6B:
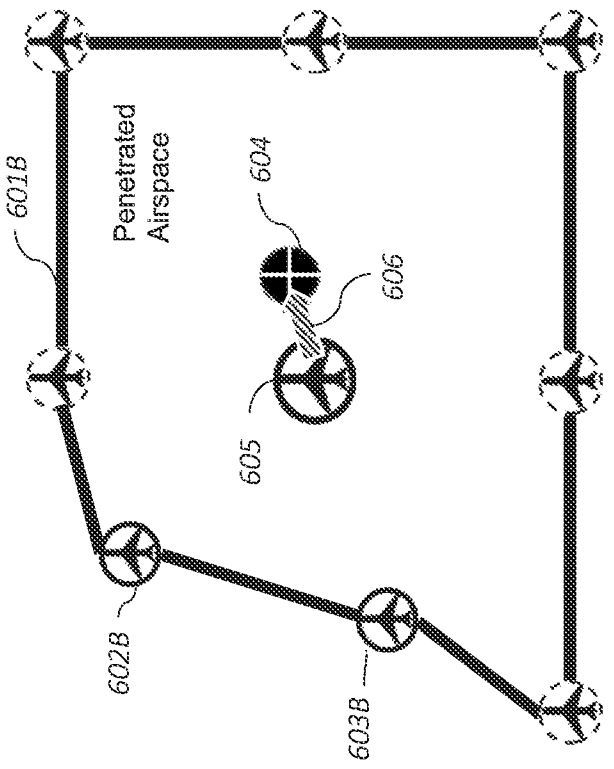
FIG. 6B shows the same airspace as FIG. 6A but with two of the left- or portside aircraft penetrating into the reference formation airspace, and the center aircraft taking action to move to the new centroid position.
Figure 7B:
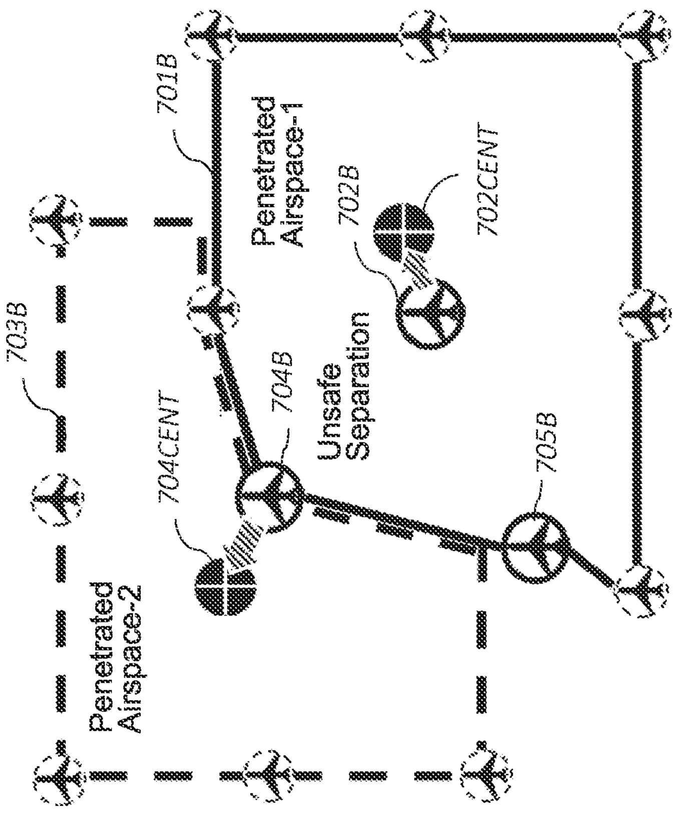
FIG. 7B illustrates the same reference formation airspaces of FIG. 7A but where each airspace has been penetrated, turning each airspace into a penetration airspace and the generation of centroids and the complementarity of the actions each aircraft takes as each independently moves to its own centroid position.

FIGS. 6A and 6B illustrate, according to an embodiment, modification of a reference formation airspace resulting in creation of a new penetrated airspace as the basis for determining a new centroid position and a target separation vector to which the reference aircraft should move to reestablish as closely as feasible separation to standard. Reference formation airspace 601A contains the set of virtual aircraft about the perimeter of the reference formation airspace constructed as a rectangle (in this two-dimensional illustration) with dimensions based on the minimum separation parameters. In addition to the virtual aircraft, aircraft 602A and 603A represent real aircraft also at the boundary of the reference formation airspace 601A. FIG. 6B illustrates the arrangement where the two real aircraft 602B and 603B have penetrated the reference formation airspace 601A, thus deforming the reference formation airspace 601A, and leading to the creation of new penetrated airspace 601B consisting of the virtual aircraft from the reference formation airspace 601A but with two of the closest virtual aircraft replaced with the two penetrating aircraft 602B and 603B. Thus, penetrating aircraft 602B and 603B are shown defining the new penetration airspace 601B with its newly-calculated centroid at 604. To start reestablishing separation, a target separation vector 606 is calculated based upon the current position of the aircraft 605 to the position of the centroid 604. The target separation vector 606 is supplied to aircraft 605 so it can navigate along the target separation vector 606 toward the penetrated airspace centroid 604 thereby regaining safe separation. Centroid position 604 will always represent a position that moves away from the location of any penetrating aircraft, while also being moderated by the remaining virtual aircraft positions. The nature of the centroid computation is to restore the mean balance across all vertices of the penetration airspace, and this tendency is sufficient for safe separation, and this movement may be complemented by other aircraft equipped with similar technology that will also be moving in complementary directions away from aircraft 605 as will be explained in connection with FIG. 7.

Figure 7A:
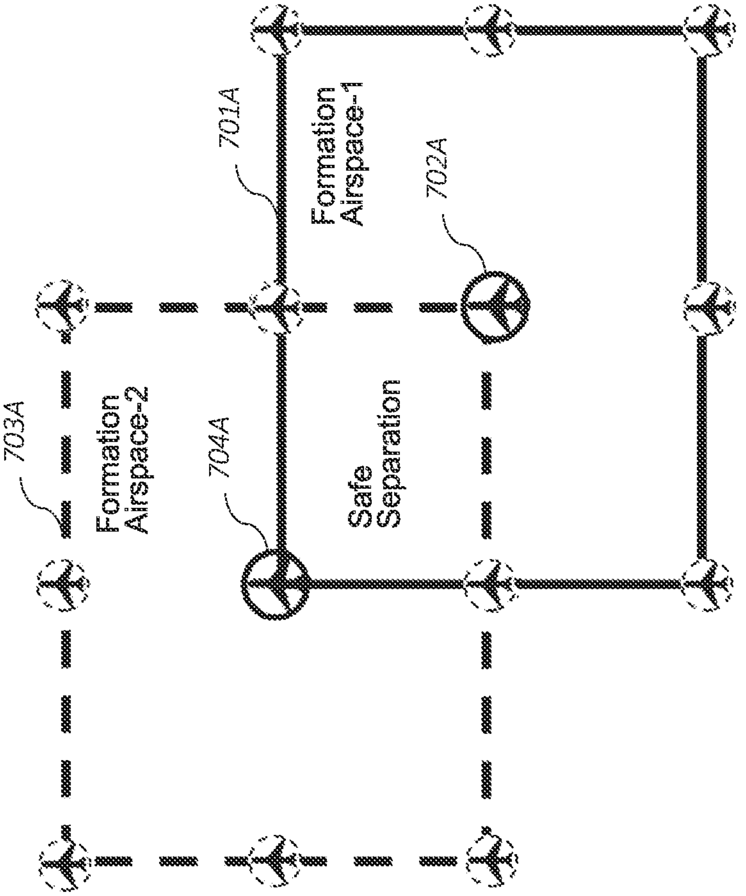
FIG. 7A illustrates the reference formation airspaces of two aircraft that are at a safe separation distance.

Turning to FIG. 7A, the experience of one of the penetrating aircraft in the prior example will now be described. Two aircraft 702A and 704A equipped with autonomous separation unit capability are shown under normal conditions, where neither aircraft has yet penetrated the airspace of the other. Each aircraft is flying within its reference formation airspace, namely, reference formation airspace 701A for aircraft 702A and reference formation airspace 703A for aircraft 704A, both positioned on the outer perimeter of the minimum required separation airspace. The reference formation airspaces overlap as noted in FIG. 4, and satellite GPS data is informing each system of the presence of the other. Again, for purposes of notation, each real aircraft 702A and 704A is illustrated with solid circles, while the virtual aircraft framing the reference formation airspaces are illustrated with dashed circles. A penetration occurs when, in FIG. 7B, aircraft 704A has shifted to position 704B, possibly due to wind shear at altitude driving the aircraft off course. This transition to penetration "deforms" the perimeters of both aircrafts' formation airspaces, since separation has been penetrated for both, thus generating new penetrated airspaces 701B and 703B now containing a combination of virtual aircraft belonging to the original reference formation airspace at a safe separation distance, and an actual penetrating aircraft. In the case of aircraft 702B, two penetrating aircraft 704B and 705B are involved in generating its penetration airspace 701B. In the case of aircraft 704B, one penetrating aircraft 702B is involved in generating its penetration airspace 703B. Irrespective of which aircraft is at fault for causing the penetration, both are deemed at an unsafe distance, both original reference formation airspaces have been penetrated, and the ideal response is for each to take complementary action to restore safe separation.

The ASU system in aircraft 704B calculates a new centroid based on its penetration airspace 703B, generating the new centroid position 704CENT among all vertices of the now-changed airspace. Similarly, aircraft 702B recalculates its own new centroid based on the deformations imposed by aircraft 704B and aircraft 705B which has also penetrated the airspace based on the example from FIG. 6B. Note that the target separation vector to centroid 702CENT is a shorter distance from the original position of 702B than the distance along target separation vector to centroid 704CENT; this because the penetration of two aircraft for penetrated airspace 701B has created a more contained airspace than that for penetrated airspace 703B, and the resulting centroid is closer to the current position of the respective reference aircraft. By contrast, the centroid 704CENT is located deeper into its penetrated airspace and further from the current position 704 because the rest of the original perimeter of the airspace remains intact.

Figures 8A, 8B:
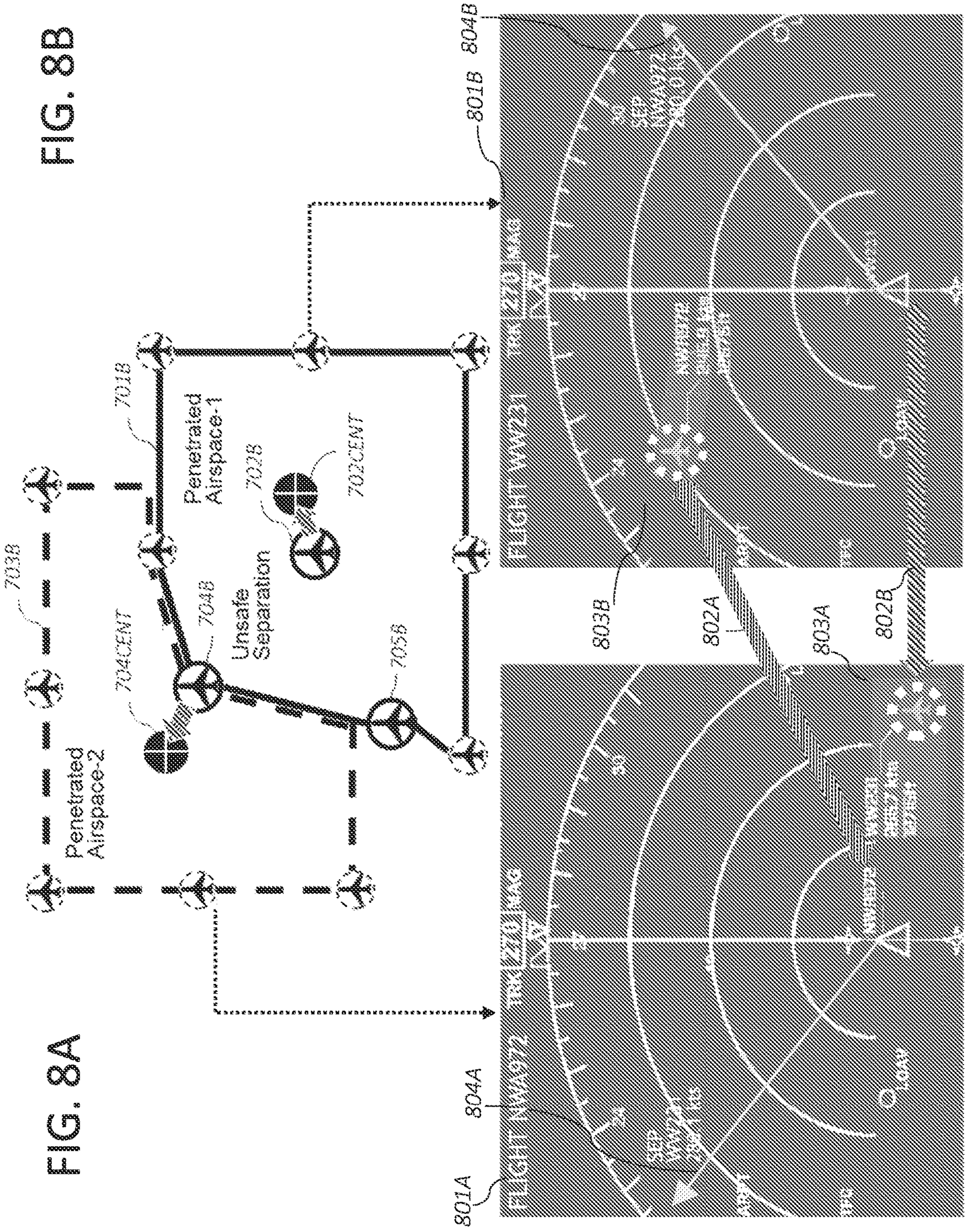
FIGS. 8A and 8B illustrate, according to an embodiment, instrument panels displaying a penetrating aircraft and a central reference aircraft and the flight path of each aircraft being vectored to its respective centroid to restore separation.

FIGS. 8A and 8B, illustrate, according to an embodiment, two aircrafts' visual displays reflecting the Autonomous Separation Unit trajectory information. The display 801A shows the situation as reflected in the penetrated airspace 703B, with aircraft call sign NWA972. The display for penetrated airspace 701B is shown in display 801B and is identified as belonging to aircraft WW231. Each display shows both aircraft, since they are inside the reference formation airspace of each other. In display 801A, NWA972 is at the center bottom, and this is its display. Flight WW231 appears as the bold circle aircraft 803A, including its identifying mark, current speed, and altitude. The hatched line 802B shows that WW231 803A is the aircraft whose display is to the right. Similarly, in display 801B, WW231 appears at the center bottom of its display, and the penetrating aircraft NWA972 803B is illustrated circled in bold dashed lines is shown in the upper left quadrant of the display with its identifying call sign. The hatched line 802A shows that aircraft NWA972 803B is the aircraft whose display is to the left. In this situational context, and based on the background computation of the respective centroid locations within each penetrated airspace 701B and 703B, each display shows recommended target separation (SEP) vectors 804A and 804B that each aircraft should pursue, indicating the system-determined direction and speed autonomously provided by each aircraft's ASU system. In display 801A, the vector arrow 804A shows the system-recommended target vector from flight WW231. Similarly, separation vector 804B in display 801B identified the target separation vector proposed for WW231 as it seeks separation from NWA972. Both separation vectors lead to the respective centroid destinations generated autonomously by each system relative to its own penetrated airspace. Accordingly, both separation vectors move in generally complementary directions away from each other to reestablish separation.

Any number of penetrations can be addressed, resulting only in the potential tightening of the airspace in which the centroid location is computed. Further, while the virtual aircraft are used to frame the reference formation airspace and typically at least a portion of a penetration airspace, these virtual aircraft are not real, and thus offer no risk of real danger even as the centroid draws closer. In fact, the framing virtual aircraft establish the closest location of potentially penetrating real aircraft and serve to circumscribe the range of movement of aircraft as the restoration of safe separation is underway.

Figure 9:
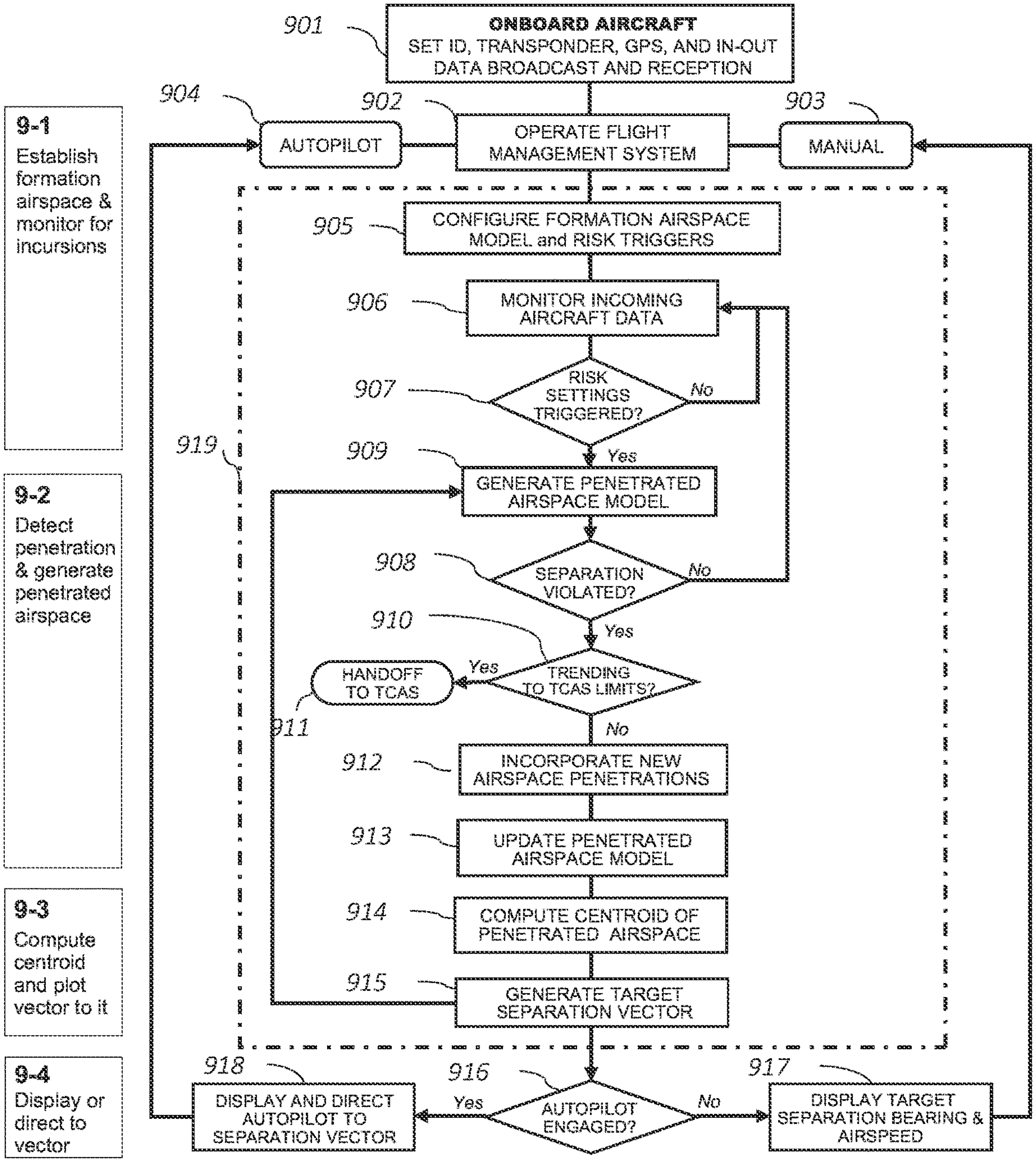
FIG. 9 is a process flow diagram illustrating the steps performed by an autonomous separation unit (ASU) according to an embodiment.

FIG. 9 illustrates, according to an embodiment, the process flow performed by the autonomous separation unit installed on an aircraft. The four boxes to the left highlight the major stages of the process flow: in stage 9-1, the system establishes the reference formation airspace and monitors for penetrations based on GPS and related positioning data; in stage 9-2 penetration is detected and the penetrated airspace model is generated; in stage 9-3 the penetration airspace centroid position is computed and a target separation vector to that location is plotted; in stage 9-4 the target separation vector is either displayed or supplied to an autopilot system of the aircraft to assume a heading according to the target separation vector.

In step 901, operation of the ASU is initiated by ensuring the aircraft ID is entered, the transponder is set, GPS signals can be received, and that both broadcast and reception to and from ATC and other aircraft are enabled. In modern aircraft operating at high altitudes (above 12,000 ft, for example), the flight management system is activated in step 902, and can be set to manual 903 or autopilot 904 operation of the aircraft. In step 905, the system is configured to establish the reference formation airspace that creates a rectangular prism frame around the aircraft at the minimum separation standard longitudinally, laterally, and vertically. In addition, in an embodiment, risk triggers can be set to govern how far away a potentially-penetrating aircraft should be before being tracked by the system and considered a threat, and when the proximity of an aircraft is such that the separation system is suspended and the Traffic Collision Avoidance System (TCAS) takes over.

Once airborne, in step 906 the ASU system monitors broadcast data from GPS and other aircraft data, and in step 907 assesses the degree to which any aircraft may pose a trigger-level risk. If the threat from an approaching aircraft is deemed a sufficient risk, in step 908 the system will generate a penetration airspace in the form of a rectangular prism with dimensions based on the minimum separation standard. In an embodiment, a set of virtual aircraft spaced about the perimeter of the penetration airspace may be defined, and virtual aircraft may be replaced or substituted with the data from the nearest-risk, real approaching aircraft. In step 909, the approaching aircraft is evaluated to determine if it has penetrated the reference formation airspace of the aircraft. If the approaching aircraft does not breach the separation distances, the system returns to monitoring incoming data in step 906. On the other hand, in step 909, if separation is violated and the approaching aircraft has penetrated the reference formation airspace, then in step 910 the incoming distance is checked to see if it is so close and closing so quickly requiring that the system automatically hands off to TCAS in step 911. However, if in step 910 TCAS is not triggered, the penetration data—for current and additional aircraft if any—is incorporated in step 912, and the penetration airspace is constructed in step 913. In step 914, the centroid of the penetration airspace is computed, and in step 915 the target separation vector is generated. In step 916, if the autopilot is engaged, then in step 918 the target separation vector is displayed and supplied to the autopilot system for the aircraft to navigate to the centroid along the target separation vector which will reestablish safe separation. If the autopilot is not engaged, then in step 917 the target separation vector information is displayed, possibly with an audible or visual indicator alerting the pilot of the penetration and the recommended target separation vector to reestablish safe separation. Further, after the target separation vector is generated in step 915, the process returns to step 908 to continuously update the penetrated airspace until, in step 909, it determines that a separation violation no longer exists.

Figure 10:
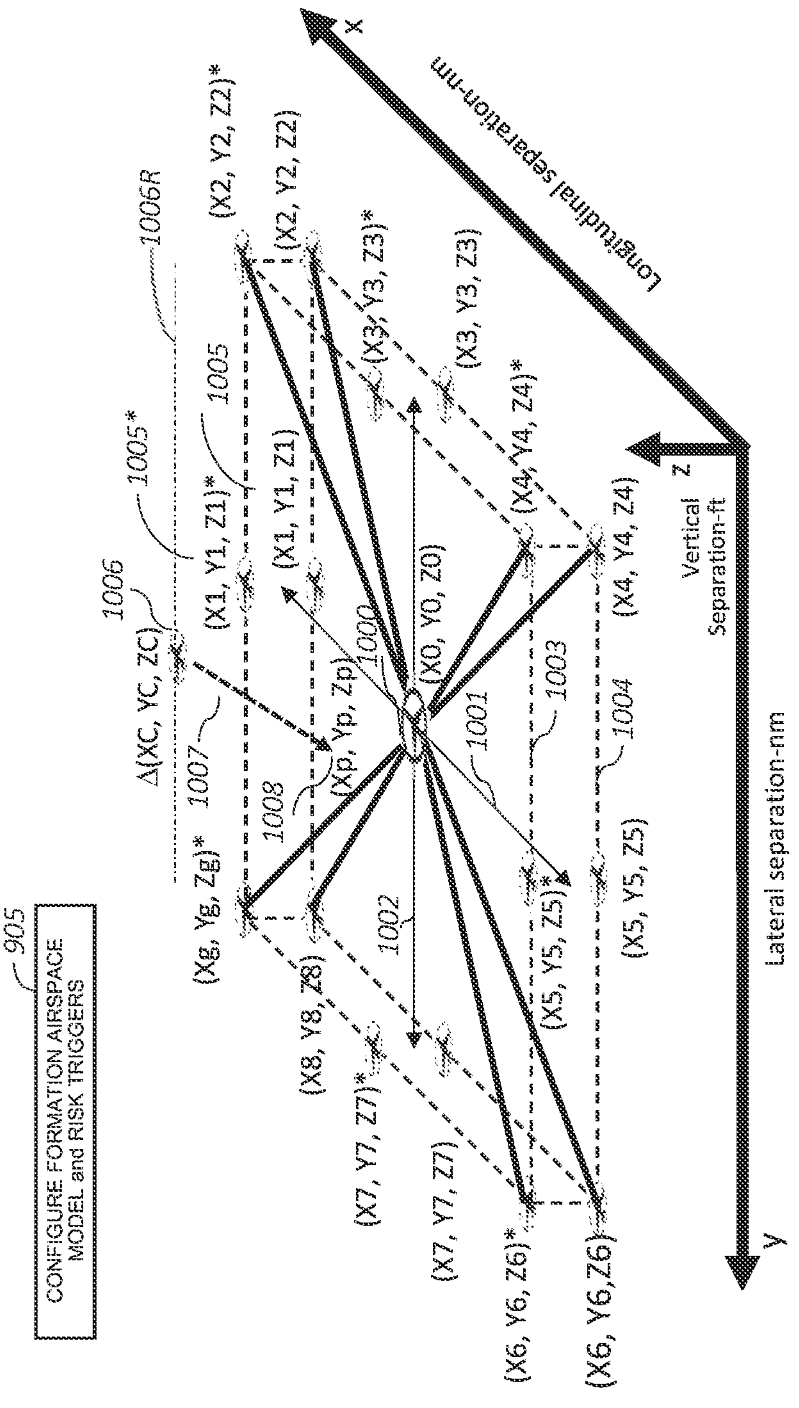
FIG. 10 illustrates the configuration of the rectangular prism of a reference formation airspace projected around a center reference aircraft, reflecting the individual elements, three-dimensional metrics, and dynamics of penetration by another aircraft.

FIG. 10 illustrates, according to an embodiment, a three-dimensional reference formation airspace as described in step 905 of FIG. 9. Minimum required longitudinal and lateral separation for the reference aircraft at 1000 located at (X0, Y0, Z0) are indicated at 1001 and 1002, respectively, and correspond to the axes x and y. Perimeter 1003 marks out the reference formation airspace above, corresponding to minimum separation above the reference aircraft, while 1004 is the corresponding lower plane of the rectangular prism forming the reference formation airspace. The vertical distance between both geometric planes is the vertical separation dimension z.

Further to FIG. 10, in an embodiment, the virtual aircraft that frame the reference formation airspace perimeter are identified. For the bottom plane, these are the virtual aircraft 1005 at position (X1, Y1, Z1), and the virtual aircraft 1005* directly above it at position (X1, Y1, Z1)*. Each of the remaining virtual aircraft on each of the top and bottom planes are similarly identified, indexing, according to this embodiment, from 2 to 8 on each dimension and indicated with an asterisk for the top plane and without an asterisk for the bottom plane. In alternative embodiments, more virtual aircraft, such as 24 spaced about the perimeter, may be designated, and fewer virtual aircraft may be designated as well.

Finally, in FIG. 10, the dynamics of penetration are illustrated. A potentially penetrating aircraft 1006 is approaching the reference formation airspace with a changing position at Δ(XC, YC, ZC) and has breached the risk trigger distance designated by 1006R. Based on the airspeed and heading of aircraft 1006, a penetration vector 1007 can be calculated identifying where and when penetration by the aircraft 1006 will occur and become a penetrating aircraft 1008 at position (XP, YP, ZP). This new position and its rate of change become the basis for each aircraft calculating the configuration of its respective penetrated airspace and computing the position of the centroid of each aircraft's penetrated airspace geometry. Because each centroid is computed relative to both the reference formation airspace and the penetrating aircraft position, the vector toward separation always considers the nearest potential aircraft (either real or virtual), and thus is following the most modest and directionally safe trajectory toward separation. The penetration aircraft, if similarly equipped with its own ASU system, performs the same maneuver with respect to its own reference formation and penetrated airspaces.

Figure 11:
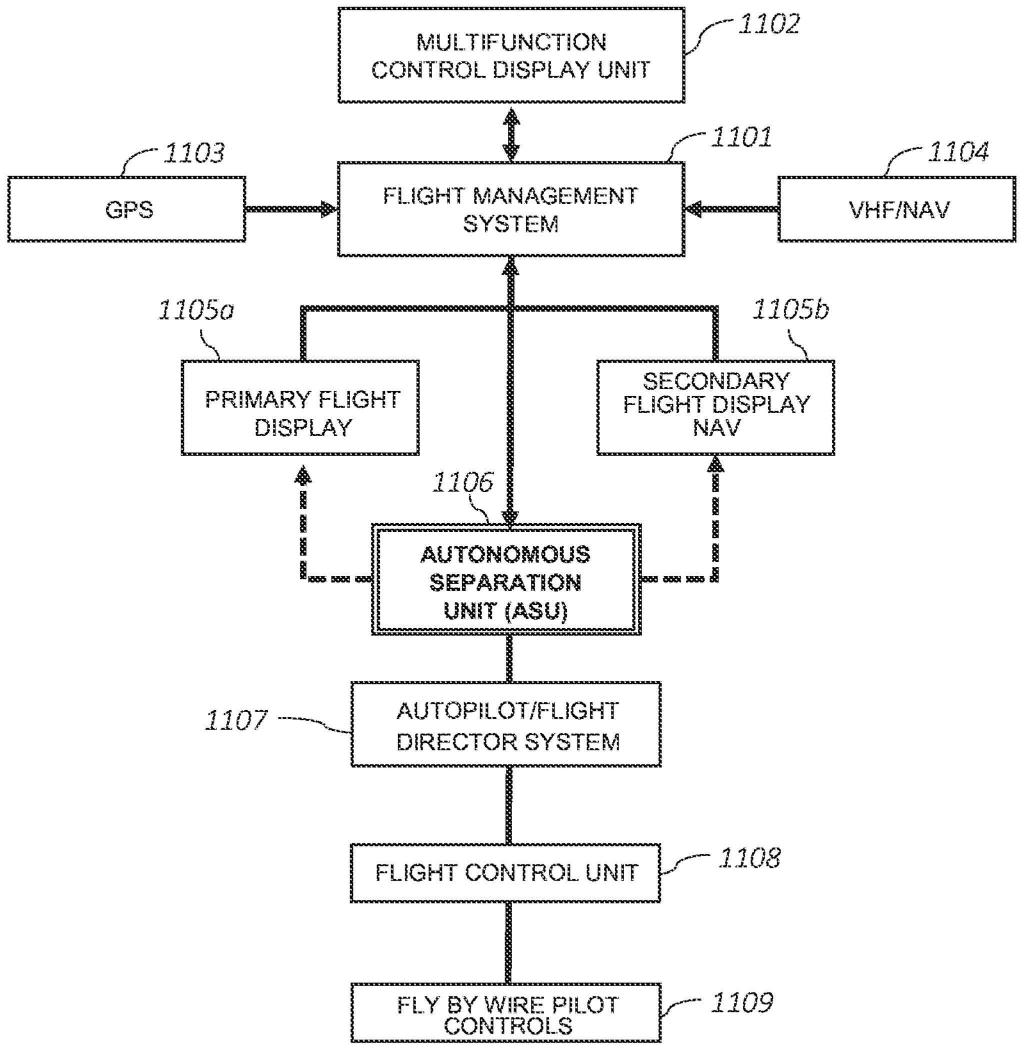
FIG. 11 illustrates, according to an embodiment, a system block diagram of an autonomous separation unit installed in an aircraft in relation to the flight management system, display units, and flight director systems.

FIG. 11 illustrates, according to an embodiment, the Autonomous Separation Unit (ASU) 1106 as deployed in relation to the onboard aircraft systems with which the ASU interacts. The foundation for all flight avionics is the Flight Management System (FMS) 1101, programmed and accessed through the Multifunction Control Display Unit (MCDU) 1102. The Flight Management System 1101 receives and processes information from a GPS unit 1103, as well as information from a VHF communication and navigation unit 1104, which it uses to identify its position and receive and process other data from air traffic control as well as other aircraft. This information and the data and images generated as a result of its interpretation are displayed on primary and a secondary flight display units 1105*a* and 1105*b*. Together, these displays show the attitude, altitude, airspeed, and heading of the aircraft (generally on the primary), and the surrounding aircraft and related situational data (generally on the secondary display). In most commercial aircraft, the Autopilot/Flight Director System 1107 enables the pilot to disengage the autopilot and take manual control of the aircraft, engaging the Flight Control Unit 1108 to access and manage the fly by wire controls 1109 guiding the multiple facets of aircraft attitude, angle of attack, airspeed, glide path, and other flight characteristics.

According to an embodiment, the Autonomous Separation Unit 1106 may be installed and interfaced with direct access to the flight management system 1101, in order to facilitate the display of information such as the separation trajectory as shown in FIG. 8, and may send flight data directly to the autopilot system 1107 or send only navigational data to the display units 1105*a* and 1105*b*, in the case of manual control of the aircraft through the flight control unit 1108 and fly by wire controls 1109.

Figure 12:
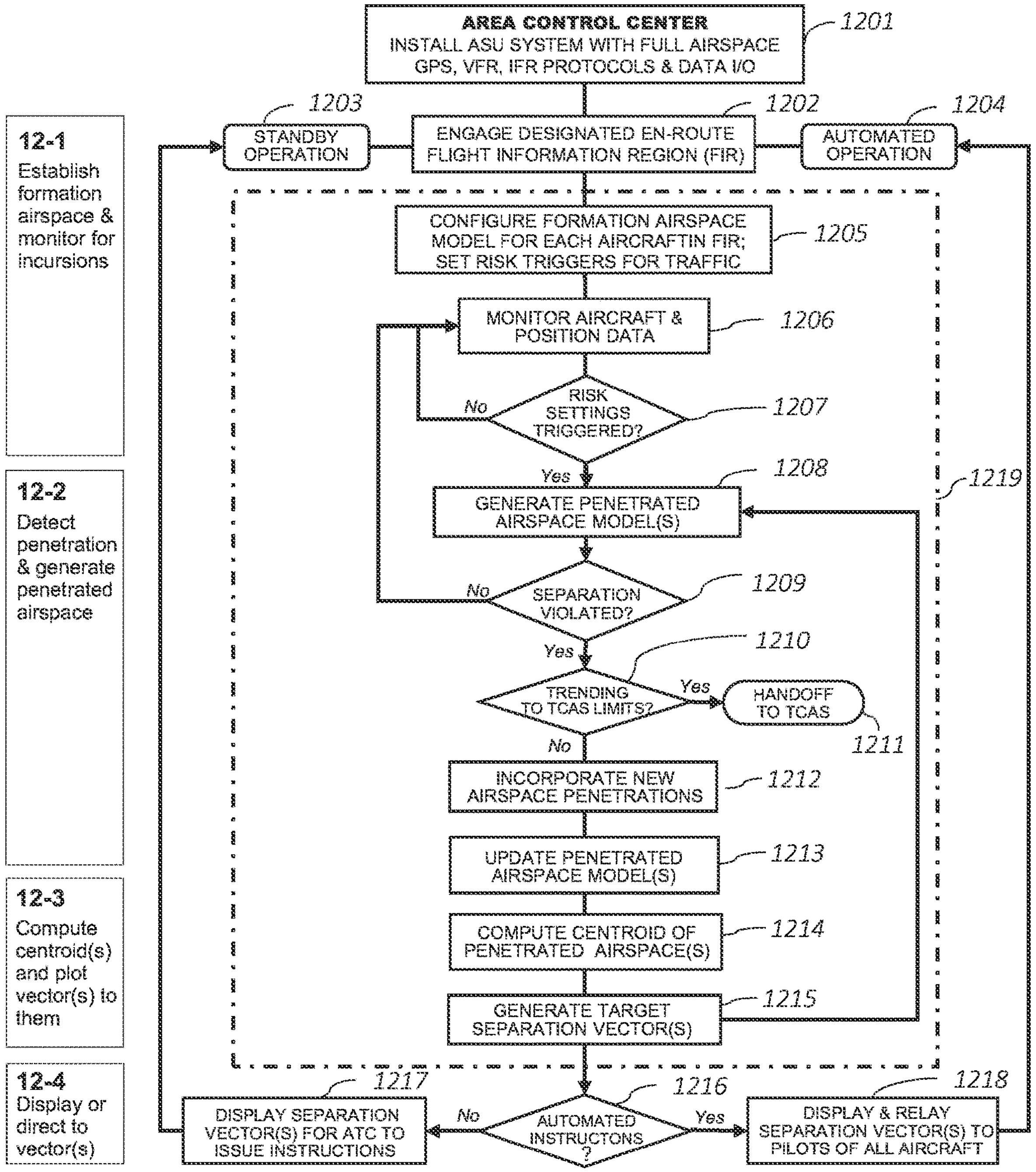
FIG. 12 is a process flow diagram illustrating the steps performed by an autonomous separation unit in an air traffic control flight information region according to an embodiment.

FIG. 12 illustrates, according to an embodiment, the steps performed by disclosed autonomous separation unit system when deployed in an air traffic Area Control Center in charge of multiple aircraft in an en-route Flight Information Region (FIR), tracking aircraft in flight and not yet approaching an airport or having just taken off. The four boxes to the left highlight the major stages of the routine performed by the autonomous separation unit: in step 12-1, the system establishes the reference formation airspaces and monitors data for all designated flights based on received GPS and related positioning data; in step 12-2, the system detects penetration and generates the penetrated airspace model; in step 12-3, the system computes the penetrated airspace centroid positions and generates the target separation vectors to those centroid positions; in step 12-4, the system either displays or directs the aircraft to assume headings according to their respective separation vectors.

In an embodiment, the ASU system is integrated with the Area Control Center 1201 and is interfaced with the GPS, VFR, IFR, communications, etc. In an embodiment, as indicated in step 1202, the ASU is deployed in an en-route FIR role, referring to a non-airport-based control center that is primarily engaged in managing aircraft en-route to their destinations and thus not within the control of origin or destination airports. In an alternative embodiment, the ASU may be deployed at an airport. The ASU can be operated in standby mode 1203 supplying data and information to controllers who would then review, amend if needed, and transmit the recommended separation actions to multiple aircraft. Alternatively, operating in an automated mode 1204, the Area Control Center-based ASU transmits instructions to multiple aircraft simultaneously after tracking and computing individual reference formation airspaces and, when needed, penetration airspaces for multiple aircraft, and determining their target separation vectors toward separation across longitude, latitude, and altitude as needed.

In addition to separation management for minimum-space adherence purposes, the ASU can also compute and transmit trajectories designed to optimize fuel efficiency and emissions, goals that are most often achieved through changes in altitude. The specific operation of the ASU in an Area Control Center tracking multiple aircraft and with full access to GPS and all related positioning, navigation, and aircraft transponder and communications performs the following representative steps:

a. In step 1205, the ASU establishes the reference formation airspace for each aircraft in its flight information region, and sets risk triggers across all three dimensions of longitude, latitude, and altitude.

b. Next, in step 1206, the ASU continues to gather information from Area Control Center inputs (GPS and related sensors and data), preparing to respond when, in step 1207, risk limits are triggered; otherwise, the system continues monitoring.

c. When a risk limit is triggered and a reference formation airspace penetration is imminent, in step 1208, the ASU generates models of the projected penetration, awaiting confirmed determination that penetration has occurred in step 1209. If, in step 1210, the confirmed penetration occurs at such a rapid pace that there is a risk of aircraft collision, the ASU so advises the pilots of the aircraft involved and indicates that the pilot in command control the aircraft in reliance on onboard traffic collision avoidance systems (TCAS) 1211 aboard all aircraft so individual pilots with situational awareness can address the relevant risks.

d. In step 1212, in a fluid situation potentially involving additional aircraft, surveillance of the airspace continues specifically to detect any additional penetration or triggered risks of penetration that need to also be managed.

e. In step 1213, as the penetrated airspace continues to evolve, the overall penetrated airspace modeling and status are continually updated.

f. Then, in step 1214, the ASU then generates the centroid location of the penetrated airspace of each aircraft at risk, and the centroid position is then used to set the target separation vector in step 1215.

g. In step 1216, Air Traffic Controllers can set or neutralize the automated instructions to aircraft, supporting either display-only, in step 1217, or display and instruct in step 1218 h. The dotted line demarcation 1219 in FIG. 12 marks the scope of ASU operations in an Area Control Center/Air Traffic Control deployment of the Autonomous Separation Unit, according to an embodiment.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The invention claimed is:

1. A method for managing aircraft flight separation of a plurality of aircraft in a flight information region for compliance with a predetermined separation standard that includes minimum longitudinal, minimum lateral and minimum vertical separation parameters, the method comprising the steps:

receiving current position data for each of the aircraft in the flight information region, constructing, for each of the aircraft in the flight information region, a reference formation airspace in the form of a rectangular prism with dimensions based upon the minimum longitudinal, minimum lateral and minimum vertical separation parameters, and with the centroid of the formation airspace as the current position of the aircraft, comparing, for a first aircraft in the flight information region, the reference formation airspace of the first aircraft to the current position of a second aircraft in the flight information region, to determine if the second aircraft has penetrated the reference formation airspace of the first aircraft, and if the second aircraft has penetrated the reference formation airspace of the first aircraft:

constructing a penetration airspace of the first aircraft representing a modification of the reference formation airspace of the first aircraft deformed by the position data of the second aircraft, determining a centroid of the penetration airspace of the first aircraft, and generating a target separation vector based upon the factors of: the direction from the current position of the first aircraft to the centroid of the penetration airspace of the first aircraft, and at least one of a factor related to optimized fuel efficiency and a factor related to fuel emissions, and transmitting the target separation vector to the first aircraft.

2. The method of claim 1 further comprising the step of transmitting the target separation vector to an air traffic control system associated with the flight information region.

3. The method of claim 1 further comprising the steps of continuously repeating the steps of receiving, constructing and comparing for each of the aircraft in the flight information region with respect to all the other aircraft in the flight information region.

4. The method of claim 1 wherein the step of constructing a penetration airspace of the first aircraft is performed by defining positions of 16 virtual aircraft located at the vertices and the center edges of the reference formation airspace of the first aircraft and the position of one of the virtual aircraft closest to the second aircraft is modified to the position of the second aircraft.

5. The method of claim 1 further comprising the steps of:

configuring a proximity risk trigger defined by a proximity distance, generating a proximity risk warning when the second aircraft is within the proximity distance to the reference formation airspace of the first aircraft, and sending the proximity risk warning to at least one of the first aircraft, the second aircraft or an air traffic control system associated with the flight information region.

6. A method for managing aircraft flight separation of a reference aircraft during flight for compliance with a predetermined separation standard that includes minimum longitudinal, minimum lateral and minimum vertical separation parameters, the method comprising:

receiving current position data of the reference aircraft, constructing a reference formation airspace in the form of a rectangular prism with dimensions based upon the minimum longitudinal, minimum lateral and minimum vertical separation parameters and the centroid of the formation airspace as the current position of the reference aircraft, defining positions of 16 virtual aircraft located at the vertices and the center edges of the reference formation airspace, receiving at least position data of other aircraft within a predetermined distance to the reference formation airspace, and if at least one of the other aircraft penetrates the reference formation airspace:

constructing a penetration airspace defined by the positions of the 16 virtual aircraft wherein the position of one of the virtual aircraft closest to the penetrating aircraft is modified to the position of the penetrating aircraft, determining a centroid of the penetration airspace, generating a target separation vector based upon the factors of: a vector extending from the current position of the reference aircraft to the centroid of the penetration airspace and at least one of a factor related to optimized fuel efficiency and a factor related to fuel emissions, and sending the target separation vector to the reference aircraft.

7. The method of claim 6 wherein the steps are continuously performed in real time.

8. The method of claim 6 further comprising the steps of:

configuring a proximity risk trigger defined by a proximity distance, generating a proximity risk warning when at least one of the other aircraft is within the proximity distance to the reference formation airspace, and sending the proximity risk warning to the reference aircraft.

9. The method of claim 8 wherein the proximity risk warning is generated when the at least one of the other aircraft is within the proximity distance to one of the virtual aircraft.

10. The method of claim 8 wherein the proximity risk trigger is further defined by a bearing and direction of the at least one of the other aircraft.

11. The method of claim 6 wherein the reference aircraft comprises a traffic collision avoidance system, the method further comprising the steps of:

configuring a collision risk trigger defined by collision risk distance, if at least one of the other aircraft is within the collision risk distance to the current reference aircraft position, handing off control to the traffic collision avoidance system.

12. The method of claim 6 wherein the reference aircraft comprises an autopilot system, the method further comprising the steps of:

if the autopilot system is engaged, sending the target separation vector to the autopilot system to autonomously guide the reference aircraft to the centroid of the penetrated airspace, if the autopilot system is not engaged, sending information regarding the target separation vector to a pilot display.

13. The method of claim 6 wherein multiple of the other aircraft are determined to have penetrated the reference formation airspace, and the penetration airspace is defined by the positions of the multiple penetrating aircraft and the positions of the virtual aircraft.

14. A method for managing aircraft flight separation of a reference aircraft during flight for compliance with a predetermined separation standard that includes minimum longitudinal, lateral and vertical separation parameters, the method comprising:

receiving position data of the reference aircraft, constructing a reference formation airspace in the form of a rectangular prism with dimensions based upon the minimum longitudinal, lateral and vertical separation parameters and the position of the reference aircraft as the centroid of the reference formation airspace, receiving position data of at least one other aircraft that is nearest to the reference formation airspace, if the at least one other aircraft penetrates into the reference formation airspace, constructing a penetration airspace representing a modification of the reference formation airspace deformed by at least the position data of the at least one other aircraft, determining a centroid of the penetration airspace, and sending to the reference aircraft a vector based upon the factors of: a direction to the centroid of the penetration airspace, and at least one of a factor related to fuel efficiency and a factor related to fuel emissions.

15. The method according to claim 14 further comprising the steps of:

defining a plurality of virtual positions spaced about the vertices and the edges of the reference formation airspace, and wherein the penetration airspace is represented by the plurality of virtual positions and the penetrating aircraft position.

16. The method of claim 15 wherein the plurality of virtual positions comprises a set of 16 positions located at the vertices and center edges of the reference formation airspace.

17. The method of claim 14 further comprising the steps of:

defining a plurality of virtual positions spaced about the vertices and the edges of the reference formation airspace, and wherein the penetration airspace is represented by the plurality of virtual positions and one of the plurality of virtual positions is substituted with the position of the penetrating aircraft.

18. The method of claim 17 wherein the plurality of virtual positions comprises a set of 16 positions located at the vertices and center edges of the reference formation airspace.

* * * * *